April 1, 1958     W. C. DAVIDON     2,829,270
APPARATUS FOR INDICATING PERCENTAGE RATIOS OF
RADIOACTIVITY AND ANALOGOUS PROPERTIES
Filed Dec. 1, 1954             2 Sheets-Sheet 1
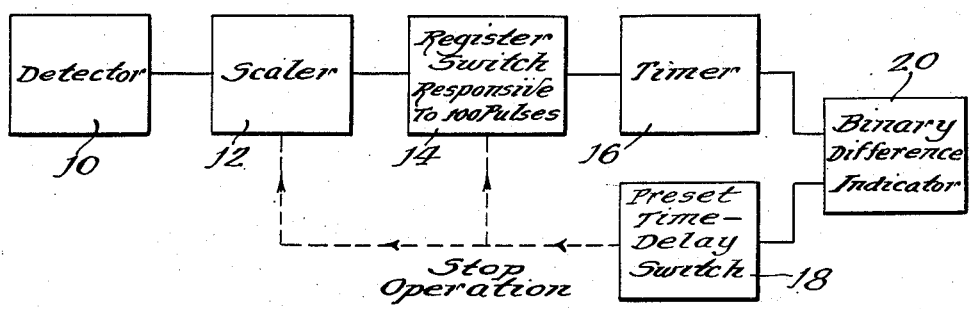
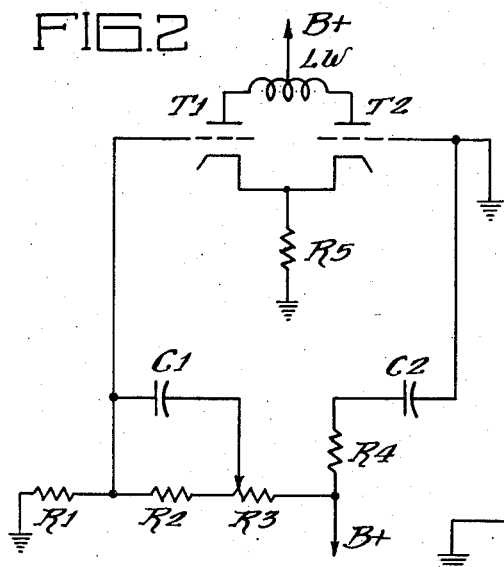
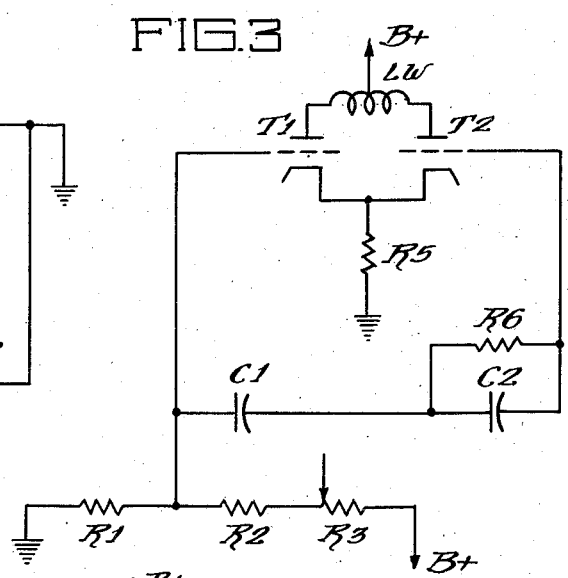
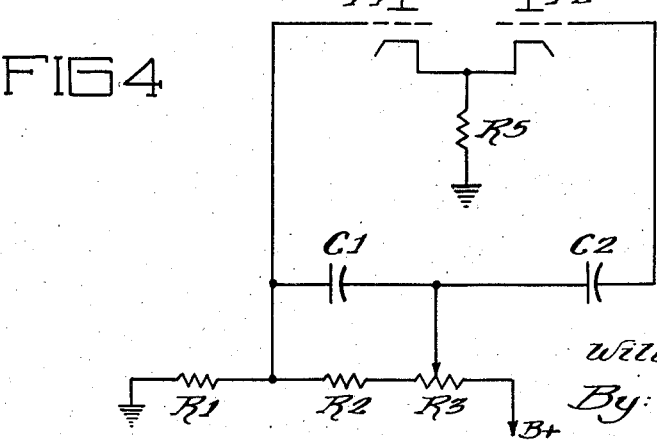
Inventor:
William C. Davidon
By: Leonard W. Nieman
Attorney April 1, 1958 W. C. DAVIDON 2,829,270
APPARATUS FOR INDICATING PERCENTAGE RATIOS OF
RADIOACTIVITY AND ANALOGOUS PROPERTIES
Filed Dec. 1, 1954 2 Sheets-Sheet 2

Inventor:
William C. Davidon
By: Leonard H. Nierman
Attorney

United States Patent Office 2,829,270
Patented Apr. 1, 1958

2,829,270

APPARATUS FOR INDICATING PERCENTAGE RATIOS OF RADIOACTIVITY AND ANALOGOUS PROPERTIES

William C. Davidon, Chicago, Ill., assignor to Nuclear-Chicago Corporation, a corporation of Illinois Application December 1, 1954, Serial No. 472,302

13 Claims. (Cl. 250—83.6)

This invention relates to a device for the measurement of radioactivity and analogous properties, and more specifically to an apparatus for indicating the percentage ratio of the radioactivity of one radioactive specimen to that of a standard specimen.

In a co-pending application of the same inventor, Serial No. 423,138, filed April 14, 1954 (now Patent No. 2,709,754), there is disclosed and claimed a novel method and apparatus for indicating such ratios. The object of the present invention is to provide improved apparatus for performance of such measurements, employing the general method described in the co-pending application above referred to.

By the present invention there is provided an apparatus for the measurement of radioactivity ratios which minimizes human error and which nevertheless is capable of being built relatively inexpensively compared to equipment required for completely automatic operation such as shown in the co-pending application. In providing the apparatus for measuring radioactivity ratios which is the principal object of the invention, there has been provided, as a portion thereof, a novel time-duplicating control system and as a portion of this control system there is provided a novel time-duplicating switch.

Portions of the apparatus to be hereinafter described are similar to corresponding portions of apparatus described in the above-mentioned co-pending application of the same inventor. Thus the present device, like the previous device, includes a radiation counting system comprising means for producing electrical pulses proportional in rate of occurrence to radioactivity and an indicating register coupled to the pulse-producing means to count the number of such pulses, an elapsed-time timer, means interconnecting the timer and the counting system to stop the operation of the timing means upon the registering of a decimal multiple of 100 pulses, and a variable time-delay switch (a switch whose contacts are operated a manually variable time after actuating of the switch) connected to the counting system to stop the counting system upon expiration of the time-delay interval. As in the previous application, the indication of percentage ratios is made by first timing the interval required to record upon the register a decimal multiple of 100 pulses in response to one radioactive sample, hereinafter called the "standard," and then producing an indication of the number of pulses transmitted to the register in a second time interval equal to the first time interval in response to a second radioactivity sample, hereinafter called the "unknown," the number of such pulses so recorded constituting a direct indication of the percentage ratio of the radioactivities of the samples. In the pending application previously filed, there are described various systems for performing these general functions, including a system in which the first timing interval is merely observed or recorded by the operator and then duplicated by setting of a separate time-delay switch for the time interval thus previously observed or recorded. In another system described in the co-pending application, the time-delay switch is set for the proper timing interval automatically, without the necessity of intervention or manual manipulation by the operator, thus making it unnecessary that the operator ever observe or record the proper time interval, the only data ever being taken by the operator being the ultimate data desired, i. e. the percentage ratio.

Automatic systems are highly desirable in that, as just pointed out, they avoid the necessity of any taking or recording of data by the operator other than the ultimate result desired. However, it is found that such automatic systems, wherein the timing interval of the time-delay switch is automatically set by the elapsed time timing means, are expensive to construct, requiring such relatively expensive components as mechanical couplings between conventional timing mechanisms or stepping-switches having hundreds of positions. By the present invention there is provided a system which affords the basic advantages of the automatic system described in the co-pending application but avoids the expense attendant upon such automatic operation by employing inexpensive parts commonly available for other purposes. In the present system there are provided manually operable presetting means on the time-delay switch to set the time-delay thereof, as opposed to the automatic setting of the time-delay switch by the elapsed-time timer described in the co-pending application. There is also provided in the present invention an indicator coupled both to the time-delay switch and to the elapsed-time timing means and responsive only to a difference between the setting of the timer switch and the elapsed time previously measured by the timing means. By the use of this indicator, which indicates only such difference, the operator sets the time-delay switch so that it will operate the counting system to record the activity of the "unknown" sample for the same period as the system was previously operated during exposure of the "standard" sample, without the necessity of observing or recording what that time interval was.

For more complete understanding of the broader aspects of the invention, and also for other novel features which are provided in the embodiments of the invention to be described, reference is made to the drawing in which:

Figure 1 is a block diagram of radioactivity ratio indicating apparatus as generally taught by the invention;

Figures 2, 3 and 4 are schematic representations of an electronic time-duplicating time-delay switch conditioned, respectively, to prepare the circuit for operation, to sense the elapsed time interval to be duplicated, and to permit manual setting of the time-delay interval of the switch to equal the elapsed time previously sensed;

Figure 5:
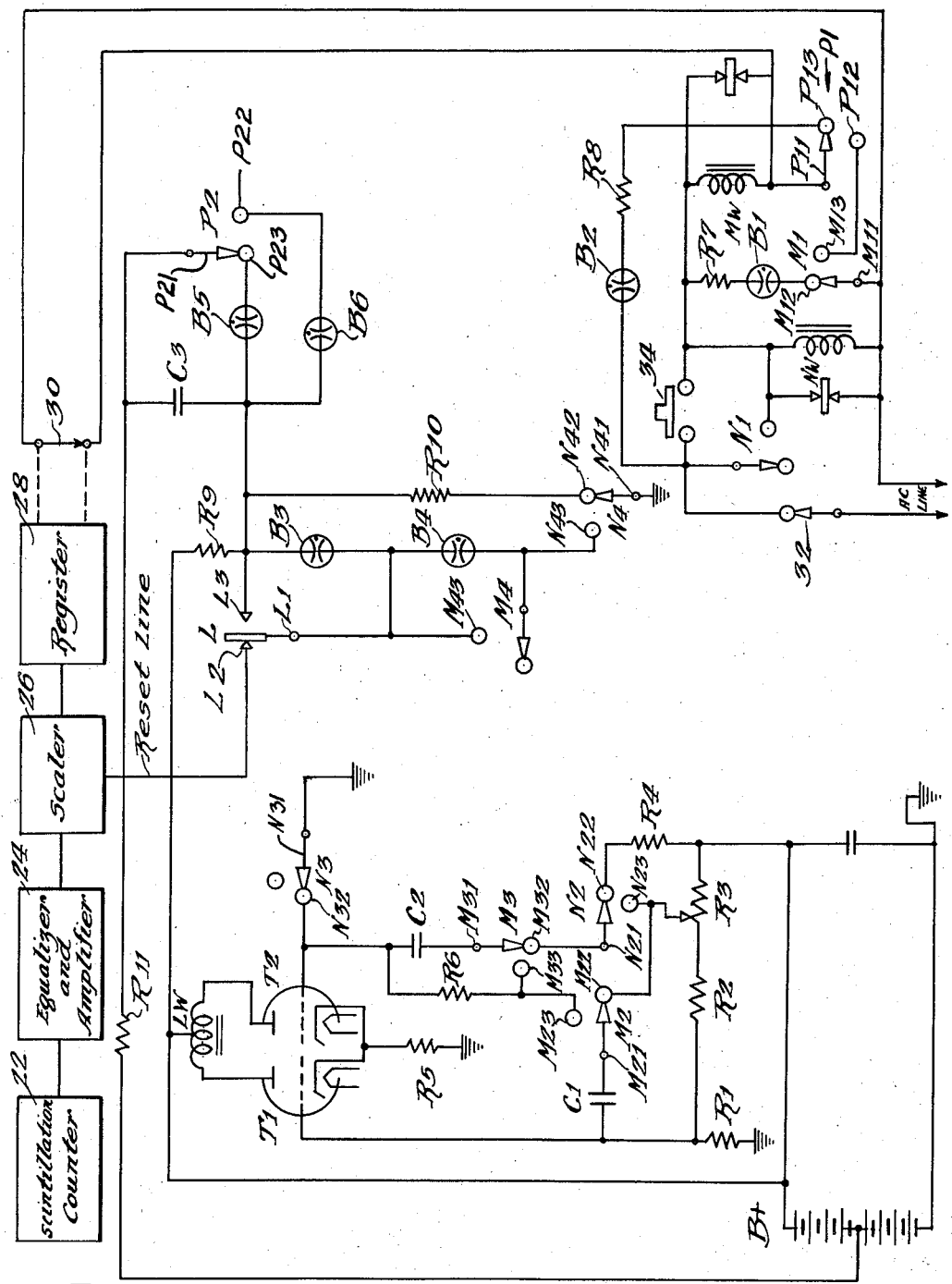
Figure 5 is a detailed schematic diagram of a complete system of the type shown in Figure 1 constructed in accordance with the invention, incorporating the time-duplicating switch of Figures 2 to 4, portions of the apparatus being shown in block form.

Referring first to Figure 1, it will be seen that a detector 10 is connected to a scaler 12, which thus produces electrical pulses proportional in rate of occurrence to the intensity of the radiation, and which is in turn connected to a register switch 14 responsive to 100 pulses (or a multiple thereof) to stop the operation of a timer 16. When the apparatus thus far described is actuated to commence a counting interval, the system runs until 100 pulses are recorded on the register switch 14, at which time the timer 16 is inactivated, thus being of the type commonly called a "predetermined count" system. There is also provided a variable time-delay switch adapted to inactivate the scaler and register upon expiration of a time-delay interval, which may be manually varied, and thus to form a "predetermined time" counting system. A binary difference indicator 20 is coupled to both the elapsed timer 16 and the time-delay switch 18 and responds only to a difference between the time previously recorded on the elapsed-time timer 16 and the time interval for which the switch 18 is set. During the "run" on the standard sample the time-delay switch 18 is either set for an interval known to be longer than the interval required for the registering of 100 pulses on the register 14 or is inactivated so that it does not prematurely stop the operation of the scaler 12 and the register 14.

When the register 14 reaches a count of 100 (or 1000, etc.), the timer 16 is inactivated. The time delay switch 18 may then be set by the operator for a timing interval equal to the interval recorded on the timer 16, without the necessity of the operator observing or recording the elapsed time for the standard run. Since the difference indicator 20 is responsive only to the difference between the time interval recorded on the timer 16 and the time interval for which the time-delay switch 18 is set, knowledge of the actual value of the time interval is immaterial to proper operation. By making the difference indicator 20 binary in its response, there are eliminated the possibilities of error in judgment and similar subjective factors which are present where it is necessary to read dials or otherwise perform mental observations or comparisons. In a binary indicator, the indication is either "on" or "off." The binary indicator 20 may be aural or visual. In the simplest type of binary indicator, a light is "on" when, for example, the setting of the time-delay switch 18 is greater than the interval recorder on the timer 16, but is otherwise "off." The timing interval of the switch 18 may thus be made equal to the time previously recorded on the timer 16 by setting the manual control provided on the switch 18 at the point at which transition from one binary state of the indicator 20 to the other occurs.

Upon the setting of the time-delay switch in this manner the equipment is ready for the measurement of the ratio of the radioactivity of an unknown sample to that of the standard sample previously measured. The scaler and register are reset to zero and the equipment is then activated with the detector 10 exposed to the radioactivity of the unknown specimen in the same orientation as previously employed with the standard specimen. The system will now record the pulses from the detector 10 as scaled by the scaler 12 until operation of the system is stopped by the time-delay switch 18 at the end of the time interval, as indicated by the dotted line designated "Stop Operation" in Figure 1 of the drawing. Upon such inactivation of the counting system, the register 14 reads directly the percentage ratio of the radioactivity of the unknown specimen to that of the standard previously exposed to the detector. If desired, a substantial number of unknown specimens may be measured without resetting the time-delay switch 18.

A variety of available components may be employed as the components shown in block form in Figure 1 of the drawing. The counting system consisting of the detector 10, the scaler 12, the register switch 14 and the timer 16 constitutes a "predetermined count" counting system of a type which is well known. The time-delay switch 18 may be of the type commonly employed in "predetermined time" counting systems. Persons skilled in the art will readily devise various forms of suitable indicators in such a manner as to respond only to differences between the interval measured by the elapsed time timer 16 and the interval of time-delay of the switch 18. In conventional preset time and predetermined count systems, however, it is necessary to provide interval timers and time-delay switches which produce a visual indication of the elapsed time or of the preset timing interval, since, in such conventional equipment, calibration of the timing and time-delay devices is essential in order that the ultimate measurement have any meaning. But in the system of Figure 1, as pointed out above, there is no necessity whatever for producing any visual or otherwise sensible indication of the absolute value of the elapsed time or the absolute value of the time for which the time-delay switch is set. The provision of the binary indicator responsive only to the difference of these time settings, and independent of the absolute values of the time settings, makes it completely unnecessary to provide time measurement and time-delay means which are capable of being read by the user or which hold calibration over long periods of time. The control system of the illustrated device is merely a time-duplicating system, rather than an absolute timing system and requires absence of drift only during the relatively short time over which the measurements are made, variations of calibration from day to day being relatively unimportant in use of the device. This being the case, the system illustrated in Figure 1 can be designed with components far less expensive and critical than conventional counting systems.

In Figures 2, 3 and 4 there is illustrated a simple and inexpensive novel combination elapsed-time timer and presettable time-delay switch which is found to be well suited for incorporation in the system illustrated in Figure 1. The illustrations of Figures 2, 3 and 4 show the circuit in a "Reset" condition wherein the system is prepared for operation (Figure 2), in a "Count" condition wherein an elapsed-time timing or time-delay switching operation is performed (Figure 3), and in a "Balancing" condition wherein the time-duplicating circuit is set manually by observation of a binary difference indicator so that when the circuit is restored to the "Count" condition, it will reproduce the time interval for which it was previously operated.

Considering first Figure 2, it will be seen that resistors R1, R2 and R3 constitute a bleeder or voltage divider connected between a B+ supply and a reference point indicated as ground. A pair of identical triodes T1 and T2 have their cathodes interconnected and their anodes connected to B+ through respective halves of the winding LW of a differential relay, i. e. a relay having contacts (not illustrated in this portion of the drawing) operated in response to differences between the currents in the halves of the windings. The grid of the triode T1 is connected to a point of fixed potential, the junction between resistors R1 and R2. The grid of triode T2 is connected directly to ground and also through a capacitor C2 and a series resistor R4 to B+. The tap on the potentiometer which serves as resistance R3 is connected through a capacitor C1 to the grid of triode T1. The cathodes of the triodes T1 and T2 are connected to ground through a common cathode resistor R5. It will be seen that when the circuit is placed in the "Reset" condition illustrated in Figure 2, the capacitor C2 charges to the full B+ voltage through the resistor R4, which is a relatively small protective resistor inserted to limit the current surge which would otherwise occur when the circuit is placed in the illustrated condition.

The condenser C1 is at the same time charged to a potential considerably less than the B+ voltage. It will be noted that in the illustration of Figure 2 the tap on the potentiometer R3 is placed at the extreme at which the minimum voltage is impressed on the condenser C1, for reasons which will hereinafter be pointed out.

The circuit is at this time ready for the commencement of a counting run on the standard sample with which unknown samples will later be compared. By suitable switching means (one example of which will be discussed hereinafter in connection with Figure 5), the circuit connections are then switched in response to an initiating stimulus to those shown in Fig. 3, simultaneously with the activation of the associated detector, scaler and register. In the condition illustrated in Fig. 3, the "Count" condition, the condensers C1 and C2 are connected in series opposition between the grid of T2 and the grid of T1, the latter being held at constant potential by connection to the tap between resistors R1 and R2. A resistor R6 is shunted across C2. When the circuit is first switched from the condition of Fig. 2 to that of Fig. 3, the grid of T2 remains at ground potential and is accordingly far more negative with respect to the cathodes (by an amount equal to the voltage across resistor R1) than the grid of T1. Accordingly, conduction is much heavier in the tube T1 than tube T2, thus actuating the contacts associated with the relay winding LW to the position corresponding with this relative state of the currents in the two tubes. While the counting operation on the standard sample proceeds, charge leaks through the timing resistor R6, reducing the potential across capacitor C2. This leakage continues until, by switching means to be later described, the circuit is switched in response to a terminating stimulus to the condition of Fig. 4, the "Balancing" condition, in which condition the resistor R6 is disconnected, and the junction between the condensers C1 and C2 is connected to the tap on the potentiometer R3. Manual adjustment of the potentiometer to increase the voltage across the capacior C1 to the point where the potential across the capacitor C1 equals the residual charge on the condenser C2 then produces equality of conduction in the tubes T1 and T2, as evidenced by a change in the condition of the contacts associated with the differential relay winding LW at the point of departure from the condition in which tube T1 is conducting more heavily than tube T2. The balancing operation must of course be performed sufficiently promptly to insure that there will be no substantial self-leakage in condenser C2. However the effect of self-leakage of C2 occurring during a counting operation is minimized by the existence of a similar self-leakage in condenser C1.

When the potentials across the condensers C1 and C2 have thus been balanced, using one or more suitable binary indicators actuated by the contacts associated with the relay winding LW, and the connections are again made as in Figure 3, the "Count" condition, the preponderance of current in tube T1 as opposed to tube T2 will be restored and will continue until condenser C2 discharges through resistor R6 to the same potential as condenser C1, i. e. the potential which remained on condenser C2 at the conclusion of the counting run on the standard sample. With suitable contacts associated with the relay winding LW to stop the operation of the counting system upon the reaching of equality of the currents in the two tubes T1 and T2, the second counting period is made equal to the first counting period.

It will be seen that the circuit illustrated in Figures 2, 3 and 4 constitutes a simple and economical combination of an elapsed-time timer, a time-delay switch, and means interconnecting the elapsed-time timer and the time-delay switch to actuate a binary indicator, such as a bulb, to indicate the existence or non-existence of difference between the interval previously recorded on the elapsed-time timer and the interval for which the time-delay switch is set.

In Figure 5 is illustrated in more complete form a system for measuring radioactivity percentage ratios incorporating the combination timer and time-delay switching device of Figures 2, 3 and 4 in a system as shown in Figure 1. In the device shown in Figure 5, a scintillation counter 22 is coupled by means of an equalizer and amplifier 24 to a scaler 26, which is in turn coupled to a register 28 having predetermined-count-actuated switch contacts 30 which are opened upon the reaching of a count of 100 on the register 28. An additional switch 32, which is preferably coupled to the reset device normally provided on the register 28 to reset the register 28 to zero, is inserted in the power line for the relay system shown in the lower right-hand portion of Figure 5. The switch 30 is thus open only when 100 counts are registered on the register 28 and the switch 32 is open only during the operation of resetting the register 28.

Connected across the power line in series with a momentary normally open switch 34 is a relay winding NW of a relay hereafter designated as relay N. The relay N has latching contacts N1 shunting the switch 34 so that the relay N is energized by momentary actuation of the switch 34 and remains energized until the switch 32 is opened. Connected in parallel with the relay winding NW is a second relay winding MW in series with the switch 30. Connected to the junction of the winding MW and the switch 30 is the movable tap P11 of a set of contacts P1 of a ganged switch P having a normal and an actuated position, and being illustrated in the latter position in the drawing. The manner of actuation of the switch P will be more fully discussed hereafter. In the normal position of the switch P1, the junction point of the relay winding MW and the switch 30 is connected to the normally open contact M13 of a set of contacts M1 of the relay M. The movable contact M11 of this set of contacts is connected to the opposite side of the switch 30. Since the movable contact M11 is normally in the open position with respect to the fixed contact M13, but moves to the closed position when the relay MW is actuated, the contacts M1 serve as latching contacts shorting out the switch 30 when the switch P1 is in the normal position.

The various components of the relays employed in the system are designated in the following manner: The relays are designated by the letters L, M and N in this description. In the drawing, and in this description, the winding of each of the relays M and N is designated by the letter "W" following the letter indicating the relay. Each set of contacts of these respective relays is given a number following the letter indication of the relay. In addition, there is appended, to indicate each individual contact of each set, a further number, the number "1" indicating the movable contact, the number "2" indicating the normally closed contact, and the number "3" indicating the normally open contact. Thus, for example, the designation "M12" indicates the normally closed contact of the contact set designated "1" of the relay M. In the case of relay L, only one set of contacts is employed, so the first number is omitted; additionally this relay has no normally closed contacts.

A similar designation is used in connection with the ganged switches P. Thus the symbol "P21" indicates the movable contact of set 2 of the contacts of switch P.

Relay contact M12 is connected across relay winding NW through a neon bulb B1 and a series current-limiting resistor R7. Switch contact P13 is connected to the switch 32 through a neon bulb B2 and a series resistor R8.

Considering now the electronic circuit shown in the left-hand portion of Figure 5, it will be seen that this circuit is the same as that shown in Figures 2, 3 and 4, with the provision of relay contacts adapted to produce the conditions of the circuit illustrated in the respective latter figures. As seen in Figure 5, two sets M2 and M3 of contacts of the relay M, and two sets N2 and N3 of contacts of the relay N, are arranged in such a manner that when neither relay is actuated the circuit is in the condition of Figure 2, when both relays are actuated the circuit is placed in the condition shown in Figure 3, and when relay N is actuated but relay M is not actuated, the circuit is placed in the condition of Figure 4. This is accomplished by the connection of the grid of tube T2 to ground through the normally closed contact N32 (contact N31 being connected to ground), connection of the condenser C2 to contact M31, and of resistor R6 and contact M23 to contact M33, contact M32 being connected to contact N21, contact N22 to resistor R4, contact N23 to the tap on resistor R3 and to contact M22, contact M21 being connected to condenser C1.

In the upper central portion of Figure 5 is shown the binary indicator system together with auxiliary portions of the control system. Two neon bulbs B3 and B4 are connected in series with a current-limiting resistor R9 between the normally open contact N43 of a set of contacts N4 and the positive terminal of the B+ supply. A resistor R10 is connected between the junction of the resistor R9 and the bulb B3 and the normally closed contact N42 of the contact set N4, the movable contact N41 being grounded. The junction of the bulbs B3 and B4 is connected to the normally open contact M43 of a contact set M4 and also to the movable contact L1 of the differential relay. The contact L2 is connected to the "reset line" of the scaler 26. The scaler 26 is of the type on which there are provided connections in the various stages which activate the scaler upon the grounding of such connections, but inactivate and simultaneously reset the scaler to zero upon the opening of the ground connection. It will be seen that if the "reset line" were grounded through an ordinary time-delay switch (as in an ordinary "predetermined time" counting system) the scaler would automatically be reset and inactivated upon opening of the switch, the purpose of such a connection being to increase the accuracy of the conventional type of system, since the resetting of the scaler 26 would, in the case of a binary scaler, add an additional count to the indication of the register 28 if the scaler 26 were inactivated when it had received a number of pulses greater than half its capacity, but would not add an additional count if it had received less than half of its capacity of counts at the time of inactivation and resetting. A similar purpose is served by the connection of the "reset line" of scaler 26 through the control system in the present instance; however, it will be obvious that the control system is not limited to use with scalers having this feature.

The contact L3 of relay L is connected to the junction of resistor R9 and bulb B3. The contact L2 is the contact which is connected to the contact L1 when the current in tube T1 exceeds the current in tube T2. The contact L3 is connected to the contact L1 when the current in T2 exceeds the current in T1. When currents in the tubes T1 and T2 are equal, the movable contact L1 is free of both the stationary contacts.

The system thus far described is supplemented by an auxiliary indicator circuit. This circuit consists of a current-limiting resistor R11 connected in series with a bulb B5 or a bulb B6, depending upon the position of contacts P2 of the switch P, a condenser C3 being connected across the one of the bulbs which is in the circuit. This series combination is connected between a tap on the B+ supply and contact L3.

The various components and connections of the system shown in Figure 5 having been described, the operation thereof may be readily understood. Consider first the situation when the system illustrated is first placed in condition to count a standard sample. In this condition neither of the relays M or N is actuated, and the condition of the circuit is as shown in Figure 5, corresponding to the condition of Figure 2. The switch P is in its actuated position, this switch being mechanically coupled to the tap on the potentiometer R3 so as to be actuated only when the portion of the bleeder voltage across which the condenser C1 is connected is minimum (the position illustrated in Figures 2 and 5) in a manner similar to the coupling of the switch and volume control in a household radio. The manner in which the combination elapsed-time timer and presettable time-delay switch is thus conditioned for subsequent operation has been described above in connection with Figure 2.

When the standard sample has been placed in proper position with respect to the scintillation counter 22, the "Count" switch 34 is momentarily depressed manually to commence the operation. This energizes relays M and N, placing the combination timing circuit in the condition of Figure 3, the "Count" condition. Upon release of the momentary switch 34, the condition of the circuit is essentially unaffected because of the operation of the latching contacts N1. The scaler 26 is activated by the energizing of relays M and N, since its "reset line" is grounded through the contacts of relay L and also contacts M4 and N4. The system operates in this condition until 100 counts are registered on the register 28, at which point the switch 30 opens. The opening of switch 30 de-energizes relay M, but does not affect the operation of relay N. The de-energizing of relay M, however, inactivates and resets the scaler 26 because of the operation of contacts M4. The combination timer circuit is now in the condition of Figure 4, and the tap on the potentiometer R3 is manually adjusted to balance the voltages on the condensers C1 and C2 as heretofore described. In this condition of the relays M and N, the bulbs B3 and B4 serve as binary indicators of the difference in charge between the condensers C1 and C2, and thus of the difference between the setting of the time-delay switch function of the combination timer circuit (determined by the setting of the potentiometer R3) and the elapsed time during which the system operated prior to the reaching of 100 counts on the register 28 in response to the standard sample (determined by the residual charge on the condenser C2 at the conclusion of the operation of counting performed on the standard sample).

The bulb B3 serves as a binary difference indicator which undergoes a transition from one state to the other substantially at the point of balance of the system. The "reset line" is connected to a point within the scaler 26 which is positive with respect to ground by a small amount, such as 35 volts. Thus when the tube T1 is conducting more heavily than the tube T2, so that contact L1 is in contact with contact L2, a voltage only slightly less than that of the B+ supply is impressed across the resistor R9 and the bulb B3, thus lighting the bulb B3. At this point the bulb B4 does not light because the "reset line" is not sufficiently above ground to light bulb B4. When the contact L1 moves off the contact L2 (the condition of balance of current in tubes T1 and T2), the B+ voltage is impressed across both bulbs B3 and B4; this voltage is so selected as to be inadequate to light both bulbs in series, so that neither bulb is lit in the balanced condition. When the opposite condition of unbalance is reached in manipulation of the potentiometer R3, the bulb B3 is shorted by the contacts L1 and L3, so that the bulb B4 is lit. It will be noted that either of the bulbs B3 or B4 can be used as a binary indicator undergoing a transition from one state to another at the point of balance, but the provision of two indicators in the manner illustrated adds materially to ease and convenience of use, the balance point being indicated by the extinction of both bulbs.

During all subsequent counting operations on samples which are to be compared with the standard thus previously measured, the tap on the potentiometer R3 is left in the same position. After the balancing operation, which matches the timing interval of the time-delay function of the combination timer circuit with the elapsed interval previously timed, the circuit continually reproduces, each time it is actuated, the original timing interval. When the register 28 is reset (by means which are conventional and not illustrated), the switch 32 is opened during the resetting operation and restores the circuit to the condition shown in Figure 5, except for the fact that the switch P is now in the position opposite to that illustrated and the tap on the potentiometer R3 is no longer at its extreme position. The reversal of the condition of contacts P1 latches in the relay M so that the relay is not inactivated by the opening of the switch 30. Thus when the "Count" switch 34 is momentarily actuated again, the scaler 26 is activated and remains activated until the operation of the time-delay switch function of the combination timer device opens the contact L2, at which point the reading of the register 28 constitutes a direct indication of the percentage ratio of the radioactivity of the unknown sample to that of the standard. Identical runs may be made with any number of unknowns desired. It will be noted that the latching of the relay M permits the recording on the register 28 of numbers of counts greater than the 100 counts originally recorded without inactivating the system. Thus the system may be employed where the ratio of the radioactivity of the unknown to that of the standard is greater than unity.

The bulbs B1, B2, B5 and B6 serve as auxiliary indicators for convenience in operating this system. It will be seen that bulb B1 is lit only when relay N is actuated but relay M is not actuated. Since this condition occurs only when the potentiometer R3 is at its extreme position, thus actuating switch P, and the scaler has just been inactivated by the opening of the switch 30, the bulb B1 serves as an indicator showing completion of the operation of counting the standard sample. Bulb B2 receives power only when the tap on potentiometer R3 is at its extreme position and switch 30 is closed, relays M and N being actuated; thus bulb B2 serves as an indicator that the counting of the standard sample is in progress.

Bulb B5 and bulb B6 perform further convenience indications. When the potentiometer R3 is in the extreme (standard) position, bulb B5 is in the circuit, and in other positions of the potentiometer R3, bulb B6 is in the circuit. It will be seen that the manner of operation of bulb B5 (or bulb B6) is interrelated with a phase of the operation of bulb B3 not heretofore discussed. The bulb B3, in addition to serving as a binary difference indicator when the combination timer is in the "Balancing" condition, also serves to indicate that contact L1 is in contact with contact L2 when the combination timer is in the "Count" condition. As pointed out above, in this condition of the combination timer, the bulb B4 is shorted by the contacts M4, thus applying the full B+ voltage to bulb B3. Since bulb B5 is connected, along with its associated resistor R11, between the B+ supply and a tap at one-half of the B+ supply, there is not sufficient voltage to light bulb B5 as long as bulb B3 is conducting, because of the drop across resistor R9 due to the current through bulb B3. However, if contact L1 should make contact with contact L3 while relay M remains energized, both bulbs B3 and B4 are shorted out, and bulb B5 lights. This can happen only if the time consumed for the recording of 100 counts on the register 28 in response to the standard sample does not occur within the maximum timing interval for which the system is designed, i. e. the timing interval corresponding to the smallest reference voltage across condenser C1. Thus the bulb B5 acts as an indicator that the standard sample is not of sufficient intensity for use with the system (or else that there is something faulty in the scaler, amplifier, etc.).

The bulb B6 operates in similar fashion to the bulb B5 except that the bulb B6 operates only when the switch contacts P2 are inactivated by moving of the tap on the potentiometer R3 from its extreme position. Thus the bulb B6 serves to indicate to the operator that the counting operation on the unknown sample is completed, and that the register 28 may thus be read as an indication of the ratio of the radioactivity intensities.

It will be noted that the connection of resistor R10 to the normally closed contact N42 of switch contact set N4 prevents the illumination of bulb B5 or bulb B6 except while relay N is energized. The voltage division between resistors R9 and R10 in this case prevents the appearance of sufficient voltage across bulb B5 or B6 to ignite it.

Exemplary values of components which may be used in the system illustrated in Figure 5 are as follows:

| | |
|---|---|
| R1 | 3K. |
| R2 | 10K. |
| R3 | 100K. potentiometer. |
| R4 | 1K. |
| R5 | 22K. |
| R6 | 30M. |
| R7 | 39K. |
| R8 | 39K. |
| R9 | 220K. |
| R10 | 100K. |
| R11 | 100K. |
| C1 | 2 mf. |
| C2 | 2 mf. |
| R1 and T2 | 12AT7 (twin triode). |
| B1, B2, B3, B4, B5 and B6 | NE51. |
| B+ | 210 volts center-tapped. |

It will be readily seen that utilization of the invention is not limited to the particular embodiments described above. Accordingly, the scope of the protection afforded the invention shall not be determined from the illustrated embodiments thereof, but shall be considered to be limited only by the appended claims.

What is claimed is:

1. Apparatus for measuring ratios of radioactivity and analogous properties comprising: a counting system including means for producing electrical pulses proportional in rate of occurrence to a property under measurement and an indicating register coupled to said pulse-producing means to count the number of such pulses; timing means adapted to measure elapsed time; means interconnecting the timing means and the counting system to stop the operation of the timing means upon the registering upon the register of a decimal multiple of 100 pulses; a time-delay switch; manually operable presetting means on the time-delay switch to set the time delay thereof; means interconnecting the time-delay switch and the counting system to stop the counting system upon expiration of the time-delay interval; and an indicator coupled both to the time-delay switch and to the timing means and responsive only to a difference between the setting of the time-delay switch and the elapsed time measured by the timing means, whereby the setting of the time-delay switch may be matched to the elapsed time required for the registering of the decimal multiple of 100 pulses in response to the property under measurement of a first sample, so that the number of pulses registered upon the register in response to the property under measurement of a second sample constitutes the percentage ratio of the property under measurement in the two samples.

2. Apparatus for measuring ratios of radioactivity and analogous properties comprising a counting system including means for producing electrical pulses proportional in rate of occurrence to a property under measurement and an indicating register coupled to said pulse-producing means to count the number of such pulses; timing means adapted to measure elapsed time; means interconnecting the timing means and the counting system to stop the operation of the timing means upon the registering upon the register of a decimal multiple of 100 pulses; a time-delay switch; manually operable presetting means on the time-delay switch to set the time interval thereof; means interconnecting the time-delay switch and the counting system to stop the counting system upon expiration of the time-delay switch time interval; a binary indicator; and means coupling the indicator both to the time-delay switch and to the timing means and responsive to the reaching of equality between the setting of the time-delay switch and the elapsed time measured by the timing means, to reverse the condition of the binary indicator, whereby the setting of the time-delay switch may be matched to the elapsed time required for the registering of the decimal multiple of 100 pulses in response to a first sample, so that the number of pulses registered upon the register in response to a second sample constitutes the percentage ratio of the property under measurement in the two samples.

3. In a measurement system for radioactivity and analogous properties comprising a counting system including: means for producing electrical pulses proportional in rate of occurrence to a property under measurement, an indicating register coupled to the pulse-producing means to count the number of such pulses, and an elapsed-time timer responsive to the time of operation of said system, and a control system for the counting system comprising means responsive to the registering of a predetermined number of pulses to inactivate the counting system and means responsive to the expiration of a manually variable preset time to inactivate the counting system; the improvement in the control system wherein there is provided an indicator coupled both to the timer and to the preset time inactivating means and responsive only to a difference between the time recorded on the timer and the time interval manually set on the preset time inactivating means, whereby the time interval of the time-responsive inactivating means may be manually matched to the time recorded on the timer without the necessity of the operator observing such time.

4. In a measurement system for radioactivity and analogous properties comprising a counting system including: means for producing electrical pulses proportional in rate of occurrence to the property under measurement, an indicating register coupled to the pulse-producing means to count the number of such pulses, and an elapsed-time timer responsive to the time of operation of said system, and a control system for the counting system comprising means responsive to the registering of a predetermined number of pulses to inactivate the counting system and means responsive to the expiration of a manually variable preset time to inactivate the counting system; the improvement in the control system wherein there is provided a binary indicator and means responsive to the reaching of equality between the time recorded on the timer and the time interval manually set on the preset time inactivating means to reverse the condition of the binary indicator, whereby the time interval of the time-responsive inactivating means may be manually matched to the time recorded on the timer without the necessity of the operator observing such time.

5. The improvement of claim 4 wherein the reversing means is responsive to the reaching of equality from only one direction and there are provided a second binary indicator and means responsive only to the reaching of equality from the opposite direction to actuate the second binary indicator.

6. A time-duplicating control system for radioactivity measurement and analogous purposes comprising an elapsed-time timer, a time-delay switch having manually operable setting means for fixing the timing interval thereof, an indicator, and means coupled to the indicator and responsive only to an inequality between the timing interval set on the time-delay switch and the elapsed time measured by the timer to actuate the indicator, whereby the time interval of the time-delay switch may be manually matched to the time recorded on the timer without the necessity of the operator observing such time.

7. A time-duplicating control system for radioactivity measurement and analogous purposes comprising an elapsed-time timer, a time-delay switch having manually operable setting means for fixing the timing interval thereof, a binary indicator, and means coupled to the indicator and responsive to the reaching of equality between the timing interval set on the time-delay switch and the elapsed time measured by the timer to reverse the condition of the binary indicator, whereby the time interval of the time-delay switch may be manually matched to the time recorded on the timer without the necessity of the operator observing such time.

8. In a time-duplicating control system for radioactivity measurement and analogous purposes, a capacitor, means for impressing a reference charge on the capacitor, means to alter constantly and unidirectionally the charge on the capacitor during a time interval to be duplicated, means for inactivating the charge-altering means at the expiration of said interval to establish a terminal capacitor potential, a further source of potential, means for varying the potential of the further potential source to balance the terminal potential of the capacitor, an electric switch, and means responsive to the reaching of balance between said potentials to actuate the switch, whereby the potential of the source may be balanced against the terminal potential of the capacitor after the first time interval, and the reference charge may thereafter again be impressed on the capacitor and the charge-altering means reactivated so that the switch is thereafter actuated upon the expiration of a second time interval equal to the first time interval.

9. The device of claim 8 wherein the charge-altering means comprises means for connecting a resistance across the capacitor and the inactivating means comprises means for disconnecting the resistance.

10. In a time-duplicating control system for radioactivity measurement and analogous purposes, a timing capacitor and a reference capacitor, means for charging the timing capacitor to a fixed potential, a resistance, means for connecting the resistance across the timing capacitor during a time interval to be duplicated, means for disconnecting the resistance from the timing capacitor upon expiration of the time interval, whereby the timing capacitor is discharged to a terminal potential dependent upon the time interval, means for charging the reference capacitor to said terminal potential, means for again charging the timing capacitor to the fixed potential and connecting the resistor across the timing capacitor, a switch, and means responsive to the reaching of equality of the potentials upon the capacitors to actuate the switch, whereby the switch is actuated at the expiration of a time interval equal to said first time interval.

11. In a time-duplicating switch for radioactivity measurement and analogous purposes, a timing capacitor and a reference capacitor, means for charging the capacitors to unequal potentials such that the potential on the timing capacitor is greater than that on the reference capacitor, a resistor, means for connecting the resistor across the timing capacitor, a switch, and means responsive to the reaching of equal potentials across the capacitors to actuate the switch.

12. In a control system for radioactivity measurement and analogous purposes comprising predetermined count switching means adapted to inactivate a counting system upon reception of a predetermined number of pulses and predetermined time switching means adapted to inactivate a counting system upon the expiration of a presettable time, said latter switching means having a maximum presettable time, the improvement wherein there is provided a coupling between said switching means constructed and arranged to disable the predetermined count means when the predetermined time means is set for a time other than said maximum time.

13. A time-delay switch for radioactivity measurement and analogous purposes comprising a differential relay having two winding portions and contacts operable in response only to differences in current between said winding portions, means coupled to one of said winding portions operable to variably preset the current therethrough, timing means, and means coupling the timing means to the other of said winding portions to vary unidirectionally the current therethrough in response to the passage of time, whereby the contacts are operated at the expiration of a variably preset time.

References Cited in the file of this patent

UNITED STATES PATENTS

| | | |
|---|---|---|
| 2,685,027 | Alvarez | July 27, 1954 |
| 2,712,081 | Fearon et al. | June 28, 1955 |